Figures 1, 2:
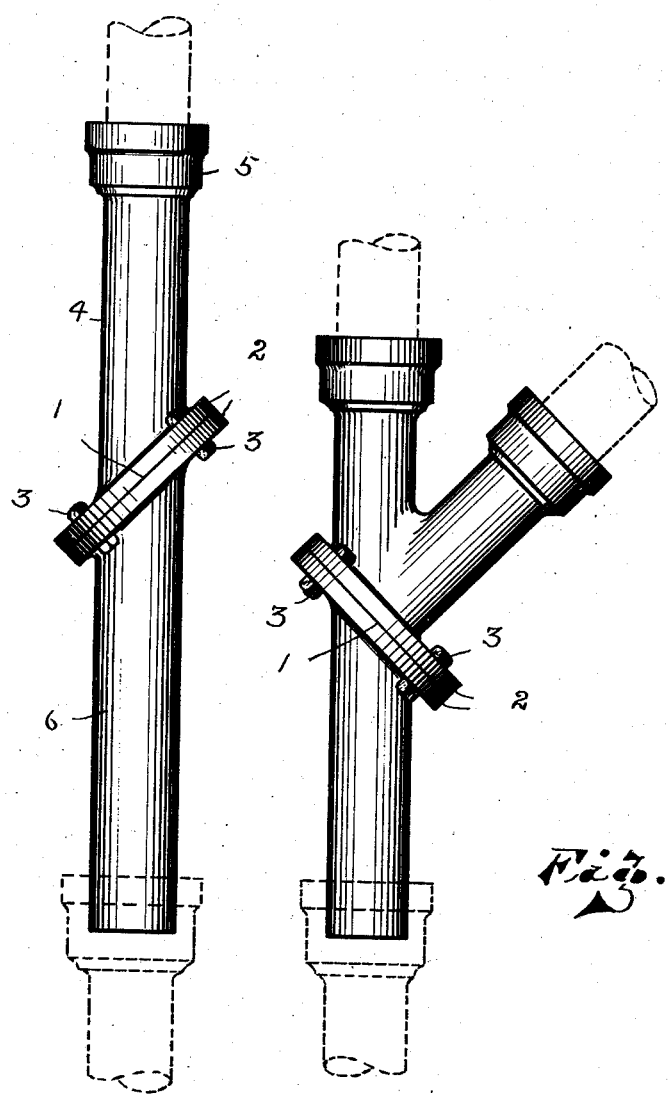

Feb. 17, 1925.

P. F. HART

PIPE CONNECTION

Filed Feb. 26, 1924

1,526,336

Inventor

PETER F. HART.

By

Attorney

Patented Feb. 17, 1925.

1,526,336

UNITED STATES PATENT OFFICE.

PETER F. HART, OF HIBBING, MINNESOTA.

PIPE CONNECTION.

Application filed February 26, 1924. Serial No. 695,221.

*To all whom it may concern:*

Be it known that I, PETER F. HART, a citizen of the United States, residing at Hibbing, in the county of St. Louis and State of Minnesota, have invented certain new and useful Improvements in Pipe Connections, of which the following is a specification, reference being had therein to the accompanying drawing.

This invention relates to pipe connections and has special reference to an improved separable length of soil pipe the principal object being to provide as simple means as possible for applying and removing a predetermined length of pipe intermediate of two fixed terminals in a pipe line.

Another object is to provide such an insertible pipe joint which when installed forms an unobstructed continuation of the pipe capacity, free from recesses or shoulders that might collect dirt or the like and form obstructions in the pipe.

Other objects and advantages of the invention will appear in the further description thereof.

Referring now to the accompanying drawing, forming part of this application and in which like reference characters indicate like parts:

Figure 1 is a side elevation of one of the improved lengths of pipe as it appears installed within a soil pipe line; and Figure 2 is a similar view of the joint as applied to a branch connection.

The difficulties accompanying the installation or removal of a length of soil pipe in a fixed line of pipe is well known to those versed in the art, for example, in initial house building, portions of a sewer pipe having been roughed in and subsequently an insertible pipe section applied in connecting the two roughed in portions, and to overcome which my improved length of pipe is separated centrally forming an angular joint as at 1, the separated ends of the pipe being provided with flanges 2 for cooperative relation with each other by suitable through bolts as indicated at 3. This joint may be provided with any desired form of gasket, not shown, but common to flange connections.

The joint is set at an angle of preferably 45° and the section of pipe 4, having one of the flanges formed integral with one end, is provided at its opposite end with the usual soil pipe hub 5; while the section 6 of the pipe length, having a flange 2 at one end, is perfectly plain at the opposite end so as to fit within the succeeding hub of the pipe line, thus it is evident that this section of the improved length of pipe may be cut any length desired to make a perfect fit intermediate of the fixed termini.

Where a branch connection is desired in an installation of this character, the flanges are preferably placed at right angles to the axis of the branch pipe, as clearly illustrated, and it is evident that the same is applicable to various forms of branches, such as Y's—T's—or the like.

Having thus described my invention, what I claim and desire to secure by Letters Patent, is:

1. An insertible pipe joint comprising one section having an obliquely disposed flange formed upon one end thereof and a hub upon the opposite end, the other section having an obliquely disposed flange on one end, cooperatively engageable with the other flange, and a plain termination at the opposite end.

2. An insertible pipe joint of the character described comprising a plain section of pipe with an obliquely disposed flange formed integral with one end and a branch section of pipe with a flange formed at right angles to one axis of said branch for cooperative engagement with the first mentioned flange.

In testimony whereof I hereunto affix my signature in the presence of two witnesses.

PETER F. HART.

Witnesses:
S. C. BRONSON,
S. GEO. STEVENS.